United States Patent
Hinz et al.

(10) Patent No.: US 8,820,824 B1
(45) Date of Patent: Sep. 2, 2014

(54) VEHICLE ROOF STRUCTURE

(71) Applicant: Honda Motor Co., Ltd., Tokyo (JP)

(72) Inventors: Christopher Hinz, Dublin, OH (US);
Masahiro Ishikawa, Dublin, OH (US);
Andrew K. Swayne, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/803,697

(22) Filed: Mar. 14, 2013

(51) Int. Cl.
*B62D 25/06* (2006.01)
*B62D 65/02* (2006.01)

(52) U.S. Cl.
CPC .............. B62D 25/06 (2013.01); B62D 65/024 (2013.01)
USPC .... 296/210; 296/29; 296/187.13; 296/193.12

(58) Field of Classification Search
CPC ........................................................ B62D 25/06
USPC .................... 296/187.13, 193.12, 210, 203.03
See application file for complete search history.

(56) References Cited

U.S. PATENT DOCUMENTS

| | | | | |
|---|---|---|---|---|
| 4,475,765 | A * | 10/1984 | Vogt et al. ..................... | 296/210 |
| 4,601,511 | A * | 7/1986 | Nakamura et al. ............ | 296/210 |
| 5,018,781 | A * | 5/1991 | Kumasaka et al. ........... | 296/210 |
| 6,347,829 | B1 * | 2/2002 | Hanyu .......................... | 296/210 |
| 6,676,203 | B2 * | 1/2004 | Lumpe et al. ................. | 296/210 |
| 6,786,538 | B1 * | 9/2004 | Turk et al. ................ | 296/216.01 |
| 7,144,076 | B2 * | 12/2006 | Wendler et al. ............... | 296/210 |
| 7,182,381 | B2 * | 2/2007 | Ogawa et al. .................... | 296/29 |
| 7,213,874 | B2 * | 5/2007 | Osterberg et al. ............. | 296/210 |
| 7,377,581 | B2 * | 5/2008 | Barutzky et al. .............. | 296/210 |
| 7,914,072 | B2 * | 3/2011 | Queener et al. ............... | 296/210 |

(Continued)

FOREIGN PATENT DOCUMENTS

| | | |
|---|---|---|
| DE | 19746165 | 4/1999 |
| DE | 19939977 | 3/2001 |

(Continued)

OTHER PUBLICATIONS

English translation of EP 1580102, computer generated on Apr. 8, 2014.*

*Primary Examiner* — Gregory Blankenship
(74) *Attorney, Agent, or Firm* — Rankin, Hill & Clark LLP

(57) ABSTRACT

A vehicle assembly includes a body including a pair of laterally spaced body members and a front roof rail and a rear roof rail spanning between the body members. The body members together with the front and rear roof rails support a roof structure. The body is formed of a steel or steel alloy. The roof structure includes a roof panel, a roof stiffener, a forward connecting member and a rearward connecting member. The roof structure is formed of aluminum or an aluminum alloy. The roof structure is bonded to the body via an adhesive. A plurality of bolts is installed along adhesive application areas between the body and the roof structure. At least one bolt connects the forward connecting member to the front roof rail and at least one bolt connects the rearward connecting member to the rear roof rail.

20 Claims, 5 Drawing Sheets

(56) References Cited

U.S. PATENT DOCUMENTS

| | | | |
|---|---|---|---|
| 7,997,643 B2 * | 8/2011 | Shah et al. | 296/210 |
| 8,123,286 B2 * | 2/2012 | Furusako et al. | 296/203.03 |
| 8,662,576 B2 * | 3/2014 | Losch et al. | 296/210 |
| 2001/0003400 A1 * | 6/2001 | Grimm et al. | 296/210 |
| 2003/0011213 A1 * | 1/2003 | Zinsmeister et al. | 296/210 |
| 2004/0046423 A1 * | 3/2004 | Wieber | 296/203.03 |
| 2004/0094992 A1 * | 5/2004 | Bohm et al. | 296/210 |
| 2005/0082880 A1 * | 4/2005 | Lee | 296/210 |
| 2005/0104418 A1 | 5/2005 | Zirbs | |
| 2008/0106124 A1 * | 5/2008 | Snider | 296/215 |
| 2012/0061998 A1 | 3/2012 | Carsley et al. | |

FOREIGN PATENT DOCUMENTS

| | | | | |
|---|---|---|---|---|
| EP | 1580102 | | 9/2005 | |
| JP | 2000272541 | | 10/2000 | |
| JP | 2003341547 | | 12/2003 | |
| JP | 2007-321880 | * | 12/2007 | B62D 25/06 |
| JP | 2010083246 | | 4/2010 | |
| JP | 2011-073569 | * | 4/2011 | B62D 25/06 |
| JP | 2011073569 | | 4/2011 | |
| JP | 2011-105102 | * | 6/2011 | B62D 25/06 |
| JP | 2012-000652 | * | 1/2012 | B62D 25/06 |
| JP | 2011-214112 | * | 11/2012 | B62D 25/06 |
| JP | 2013-184503 | * | 9/2013 | B62D 25/06 |

* cited by examiner

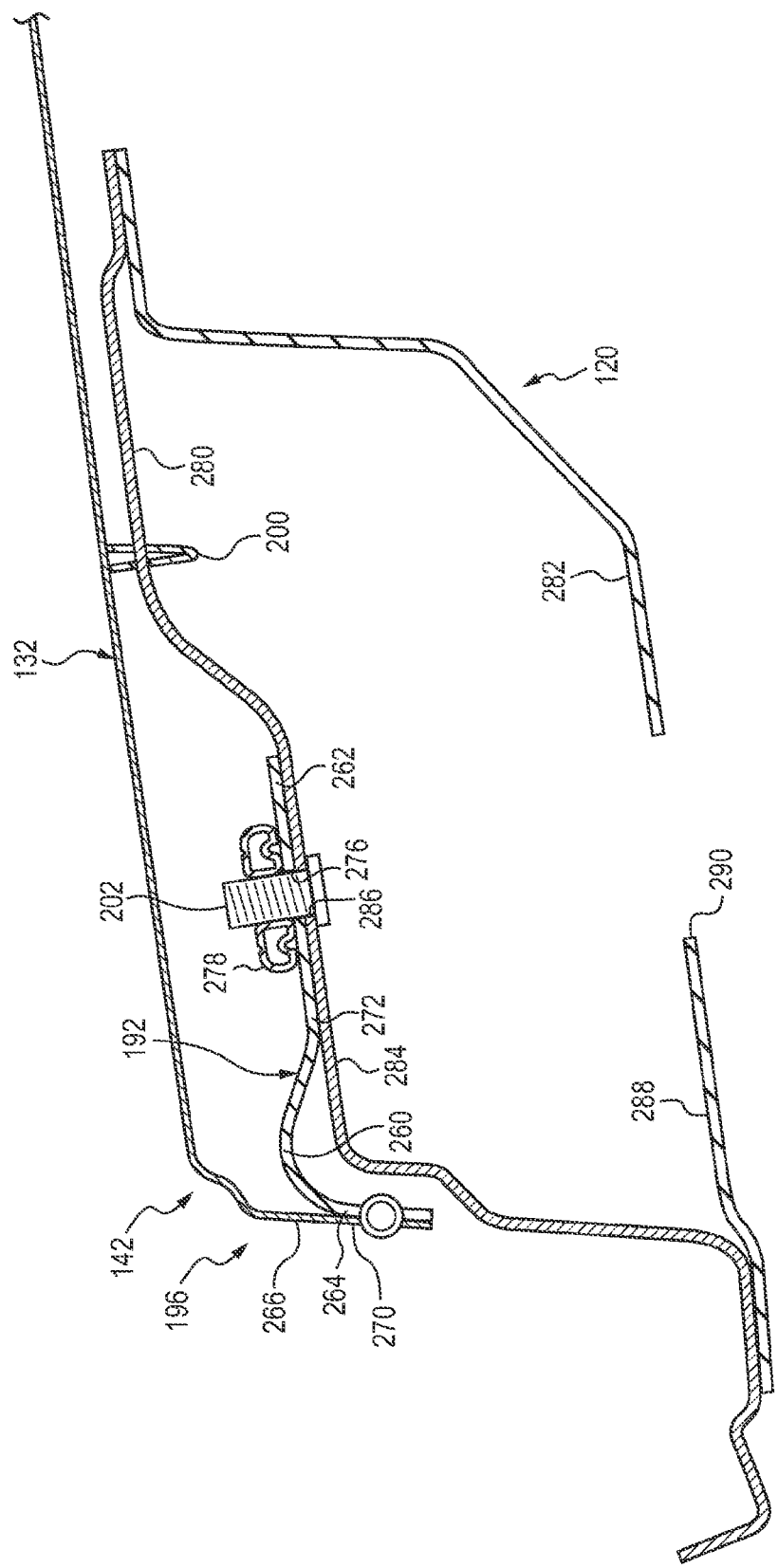

VEHICLE ROOF STRUCTURE

BACKGROUND

The substitution of aluminum or aluminum-based alloy roof panels for the low-carbon steel or steel alloy roof panels most commonly used in motor vehicles is an attractive option for vehicle mass reduction. Often, however, the remainder of the vehicle body structure continues to be fabricated of steel. Joining an aluminum roof panel to a steel body panel is difficult due to the thermal expansion considerations of the dissimilar materials. The combination of the aluminum roof panel attached to the steel body may create compressive stresses in the aluminum roof panel when the body is subjected to elevated temperatures such as those required to cure or bake the paint applied to the body. These stresses may lead to unacceptable appearance features in the visible segment of the roof panel.

Manufacturers currently secure the aluminum roof panel to the steel body panel after the weld process in assembly. This process typically includes an adhesive bonding operation. Self-piercing rivets can also be used to secure the aluminum roof panel to the steel body panel. This approach, though appealing from a vehicle mass-reduction viewpoint, raises issues due to the significantly different coefficients of thermal expansion of aluminum and steel (about $22.5 \times 10^{-6}$ m/m K for aluminum and about $13 \times 10^{-6}$ m/m K for steel). The adhesive must be able to absorb the distortion caused by the thermal expansion difference between the roof panel and the steel body panel. Further, because the steel and aluminum are permanently joined together by the rivets, this difference in thermal expansion of steel and aluminum will develop stresses in the aluminum and steel whenever the vehicle body temperature differs from the temperature at which the joint was made. The highest temperature experienced by the vehicle body is during manufacture, when the assembled body is painted. Automotive paint consists of a number of layers, applied separately and then cured at elevated temperature. The paint is cured by passing the painted body through one or more paint bake ovens to raise the body temperature to about 180-200° C. and maintain it at that temperature for at least 20 minutes. This elevated temperature may be sufficient to initiate plastic deformation in the aluminum roof panel. Since plastic deformation is not reversed on cooling, any such deformation may result in an appearance feature such as a crease or buckle in the roof panel which would be unacceptable to the customer.

Further, having the roof and vehicle body panels in contact or electrically connected can create galvanic corrosion. The risk for this corrosion is increased when water is present, such as in the roof gutter areas. As it relates to the adhesive, the current joining process uses the paint bake ovens to cure the adhesive bonding the aluminum roof panel to the steel body panel. However, the heat from the paint bake ovens can cause distortion of the aluminum roof panel relative to the steel body, creating a bowing effect. If left unconstrained, the roof panel would bow enough to break the adhesive bond between the roof panel and vehicle body.

BRIEF DESCRIPTION

In accordance with one aspect, a vehicle assembly comprises a vehicle body including a pair of laterally spaced body members for defining sides of a passenger compartment and a front roof rail and a rear roof rail spanning between the body members. The body members together with the front and rear roof rails support a vehicle roof structure over the passenger compartment. The vehicle body is formed of steel or a steel alloy. The vehicle roof structure includes a roof panel, a roof stiffener, a forward connecting member and a rearward connecting member. The vehicle roof structure is formed of aluminum or an aluminum-based alloy. The vehicle roof structure is bonded to the vehicle body via an adhesive. A plurality of bolts is installed along adhesive application areas between the vehicle body and the vehicle roof structure for attaching the vehicle roof structure to the vehicle body. At least one bolt connects the forward connecting member to the front roof rail and at least one bolt connects the rearward connecting member to the rear roof rail. The adhesive together with the plurality of bolts reduce thermal distortion of the attached roof panel relative to the vehicle body when the vehicle assembly is heated in a paint bake oven during the manufacture of the vehicle assembly.

In accordance with another aspect, a vehicle assembly comprises a vehicle body including a pair of laterally spaced body members for defining sides of a passenger compartment and a front roof rail and a rear roof rail spanning between the body members. The body members together with the front and rear roof rails support a vehicle roof structure over the passenger compartment. The vehicle body is formed of steel or a steel alloy. The vehicle roof structure includes a roof panel and is formed of aluminum or an aluminum-based alloy. The vehicle roof structure is bonded to the vehicle body via an adhesive. A plurality of bolts is installed along adhesive application areas between the vehicle body and the vehicle roof structure to hold the position of the roof panel on the vehicle body. The plurality of bolts have a spacing or pitch between adjacent bolts of approximately 450 mm and the adhesive provides for a continuous spacing between the roof panel and the vehicle body of approximately 4 mm to approximately 6 mm. The adhesive together with the plurality of bolts reduce thermal distortion of the attached roof panel relative to the vehicle body when the vehicle assembly is heated in a paint bake oven during the manufacture of the vehicle assembly.

In accordance with yet another aspect, a method of assembling a vehicle is provided. The method comprises providing a vehicle body formed of steel or a steel alloy and a vehicle roof structure formed of aluminum or an aluminum-based alloy. The vehicle body includes a pair of laterally spaced body members, a front roof rail and a rear roof rail. Each roof rail spans between the body members and is welded to the body members. The vehicle body defines a roof. The vehicle roof structure includes a roof panel, a roof stiffener, a forward connecting member and a rearward connecting member. The roof stiffener, forward connecting member and rearward connecting member are welded to the roof panel. An adhesive is applied around the entire perimeter of the roof. The vehicle roof structure is positioned on the roof, and a plurality of bolts is installed between the roof and vehicle roof structure. At least one bolt connects the forward connecting member to the front roof rail and at least one bolt connects the rearward connecting member to the rear roof rail.

BRIEF DESCRIPTION OF THE DRAWINGS

FIG. 4 is a cross-sectional view taken along a rearward portion of the assembled vehicle assembly.

DETAILED DESCRIPTION

It should be understood that the description and drawings herein are merely illustrative and that various modifications and changes can be made in the structures disclosed without departing from the present disclosure. In general, the figures of the exemplary vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle roof structure disclosed herein are merely terms of art that may vary from one manufacturer to another and should not be deemed to limit the present disclosure.

Figure 1:
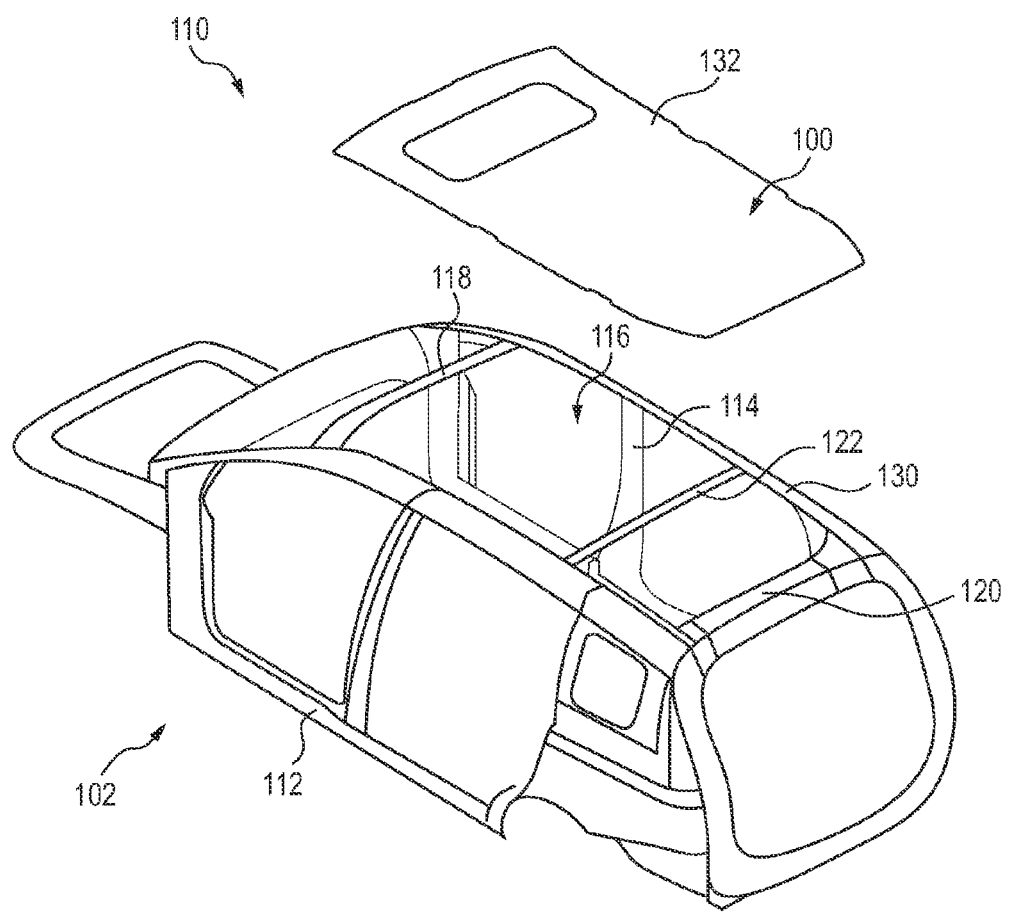
FIG. 1 is an exploded perspective view of a vehicle assembly including a vehicle body formed of steel or a steel alloy and a vehicle roof structure formed of aluminum or an aluminum-based alloy.

Increasingly, low-carbon steel or steel alloys, long the material of choice for vehicle body construction, is being displaced by higher strength-to-weight ratio materials such as aluminum or aluminum-based alloys. This trend is driven by a desire to reduce vehicle weight for improved fuel economy. An example of this is the exemplary vehicle assembly 110 which has an aluminum or aluminum-based alloy vehicle roof structure 100 attached to a steel or steel alloy vehicle body 102. As schematically shown in FIG. 1, the vehicle body 102 includes a pair of laterally spaced body members 112, 114 for defining sides of a passenger compartment 116 and a front roof rail 118 and a rear roof rail 120 spanning between the body members. A cross member or roof bow 122 interposed between the front and rear roof rails 118, 120 extends between the spaced body member 112, 114. The body members together with the front and rear roof rails 118, 120 support the exemplary vehicle roof structure 100 over the passenger compartment 116. The vehicle body 102 also defines a roof 130 to which is attached the exemplary vehicle roof structure 100.

Figure 2:
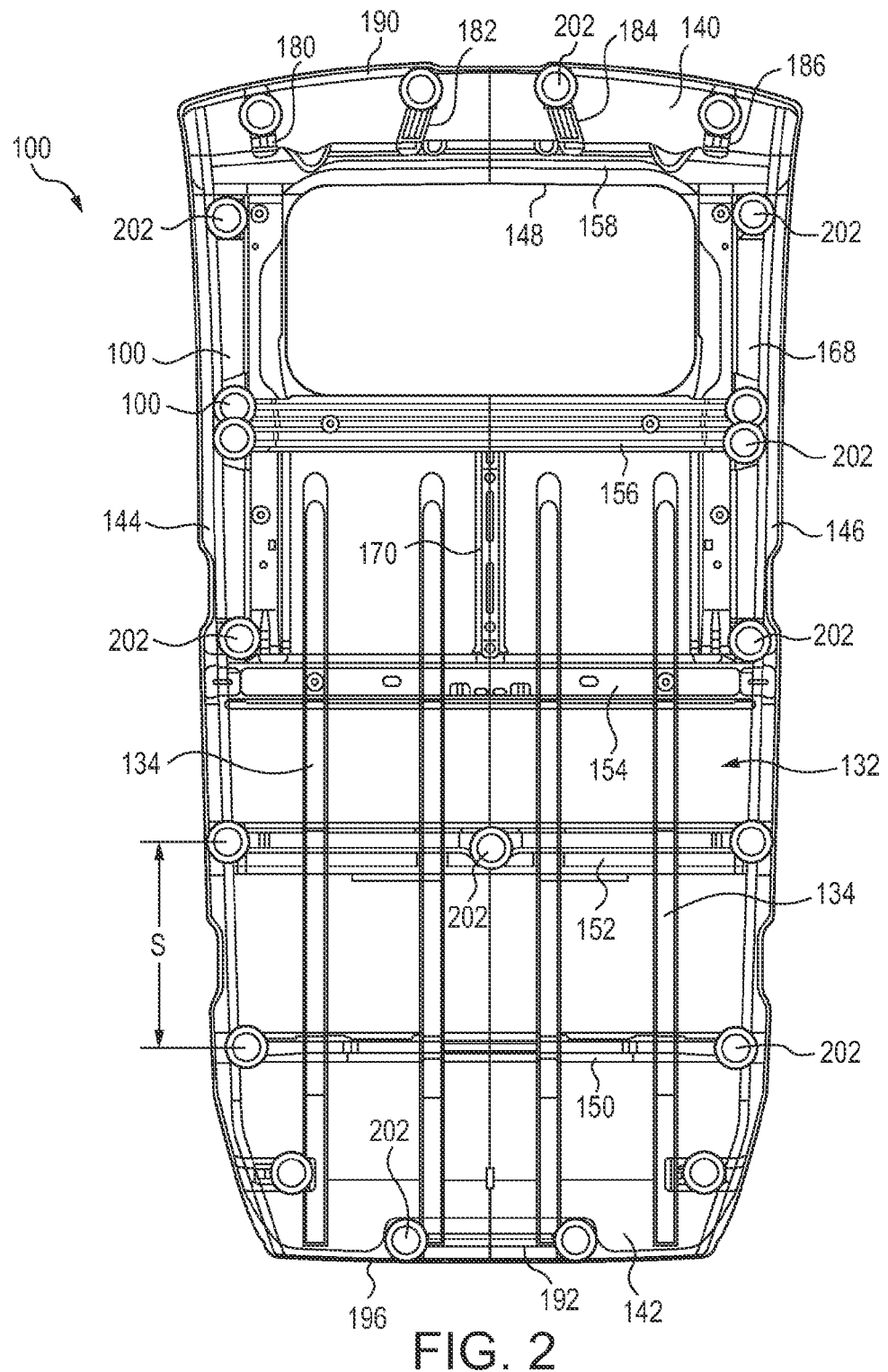
FIG. 2 is a plan view of the vehicle roof structure of FIG. 1, the exemplary vehicle roof structure including a roof panel, a roof stiffener, a forward connecting member and a rearward connecting member.

With reference to FIG. 2, the vehicle roof structure 100 includes a roof panel 132 which overlies the passenger compartment 116. The roof panel 132 can include stiffening ribs 134 adapted to accommodate loads imparted on the roof panel by articles transported thereon, for example in a luggage rack. These ribs are commonly used on vehicles such as SUVs or vans because the roof panels for these vehicles are extensive and generally flat. The ribs 134 stiffen the roof panel 132 and help it to maintain its shape. For roof panels used in smaller vehicles, such as sedans, these ribs are generally not required. The roof panel 132 is generally rectangular in plan view but because individual vehicle roof structures are required to conform to vehicle styling, the roof panel can have alternative shapes. The roof panel 132 includes a forward end portion 140, a rearward end portion 142 and opposite side portions 144, 146 which extend longitudinally between the forward and rearward end portions. As is well known, an opening 148 can be provided in the roof panel for a sunroof assembly (not shown).

The vehicle roof assembly 100 further includes at least one roof stiffener. As shown, the at least one roof stiffener can include roof stiffeners 150, 152, 154, 156, 158 which extend between the side portions 144, 146. In the assembled condition of the vehicle assembly 110, roof stiffener 152 overlies the roof bow 122. Roof stiffeners 156, 158 flank the opening 148 and have respective end portions connected or welded to side reinforcements 166, 168 which can be secured to forward parts of the respective side portions 144, 146. A support member 170 spans between and is connected to the roof stiffeners 154, 156. At least one forward connecting member formed of an aluminum or aluminum-based alloy is provided at the forward end portion 140 of the roof panel 132. In the depicted embodiment, the vehicle roof structure 100 includes four spaced forward connecting members 180, 182, 184, 186. Each forward connecting members extends substantially longitudinally on the roof panel 132 between the roof stiffener 158 and a forward peripheral edge portion 190 of the roof panel 132. A rearward connecting member 192 formed of aluminum or an aluminum-based alloy is provided at the rearward end portion 142 of the roof panel 132. As depicted, the rearward connecting member 192 extends laterally across the roof panel 132 between the side portions 144, 146 adjacent to a rearward peripheral edge portion 196 of the roof panel 132. Each of the forward connecting members and the rearward connecting member is separate from the roof panel 132 and is fixedly secured thereto to facilitate bolting between the roof panel and the vehicle body 102.

The exemplary vehicle roof structure 100 is bonded to the vehicle body 102 via an electrically nonconductive adhesive 200. A plurality of bolts 202 is installed along adhesive application areas between the vehicle body 102 and the vehicle roof structure 100 for attaching the vehicle roof structure to the vehicle body. Each bolt 202 is inserted from beneath the roof panel 132 which provides access to the bolts for automated bolt installation. The bolts 202 connect each of the forward connecting members 180, 182, 184, 186 to the front roof rail 118 and connect the rearward connecting member 192 to the rear roof rail 120.

It should be appreciated that the locations of the bolts 202 along the adhesive application areas between the vehicle roof structure 100 and vehicle body 102 is generally dictated by the need for the strength of the attachment between the vehicle roof structure and vehicle body and more, closely-spaced, bolts will promote stronger attachment. However, it should also be appreciated that distortion of the roof panel 132 can be minimized when fewer bolts 202 are employed. Thus, as will be discussed below, according to the present disclosure, the plurality of bolts 202 includes approximately twenty-one (21) bolts with a predetermined spacing or pitch S between adjacent bolts. As shown in FIG. 2, according to one aspect, the predetermined spacing or pitch S between adjacent bolts 202 provided along an outer periphery of the vehicle roof structure is approximately 450 mm. This number of bolts together with the adhesive provides the required attachment strength between the vehicle roof structure 100 and the vehicle body 102. In addition, the adhesive 200 provides for a continuous spacing between the roof panel 132 of the vehicle roof structure 100 and the vehicle body 102 of approximately 4 mm to approximately 6 mm. According to one aspect, the spacing between the roof panel 132 and the vehicle body 102 is approximately 5 mm. This continuous spacing between the vehicle roof structure and vehicle body eliminates the concern for galvanic corrosion. It should also be appreciated that the adhesive 200 can serve as a seal to prevent the intrusion of water and dirt debris and the predetermined spacing controls the flow and location of the e-coat on the vehicle assembly 110. The adhesive 200 together with the plurality of bolts 202 reduce thermal distortion of the attached roof panel 132 relative to the vehicle body 102 when the vehicle assembly 110 is heated in a paint bake oven during the manufacture of the vehicle assembly.

Figure 3:
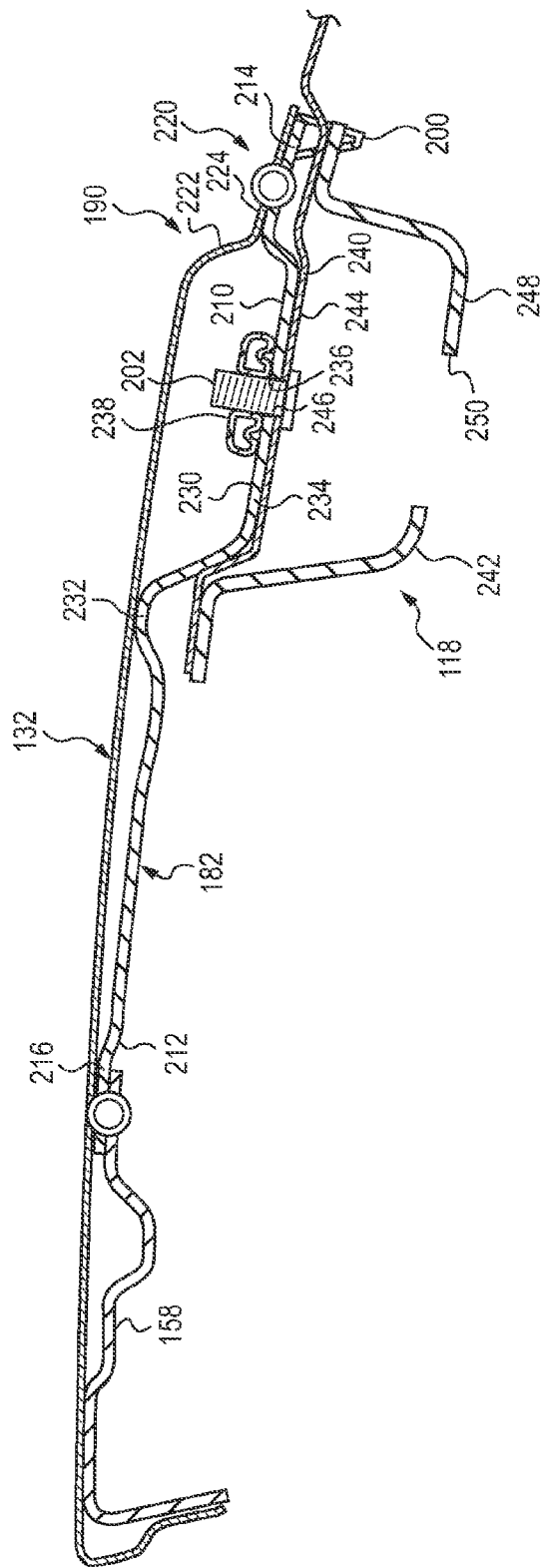
FIG. 3 is a cross-sectional view taken along a forward portion of the assembled vehicle assembly.

Each forward connecting member 180, 182, 184, 186 includes a forward end portion secured to the roof panel and a rearward end portion secured to the roof stiffener. Particularly, and by way of example, FIG. 3 depicts forward connecting member 182 provided at the forward end portion 140 of the roof panel 132. The forward connecting member 182 includes a forward end portion 210 and a rearward end portion 212. The forward end portion 210 includes a forward mounting flange 214 and the rearward end portion 212 includes a rearward mounting flange 216. As indicated previously, provided at the forward end portion 140 of the roof panel 132 is the forward peripheral edge portion 190. A flange structure 220 is provided at the forward peripheral edge portion 190. The flange structure is defined by a vertical wall 222 and a horizontal wall 224. The mounting flange 214 of the forward end portion 210 of the forward connecting member 182 is fixedly secured (e.g. welded) to the horizontal wall 224. The mounting flange 216 of the rearward end portion 212 is fixedly secured (e.g. welded) to the roof stiffener 158, and, as shown, the mounting flange 216 is sandwiched between the underside of the roof panel 132 and the roof stiffener 158.

Each forward connecting member 180, 182, 184, 186 can further include a recessed portion mounted to the front roof rail 118 and a raised portion which engages the underside of the roof panel 132. With reference again to FIG. 3, and by way of example, the forward connecting member 182 includes a recessed portion 230 and a raised portion 232 located rearward of the recessed portion. The recessed portion 230 includes a bottom wall 234 having a mounting opening 236. A locking member, such as a weld nut 238, is secured to the bottom wall 234 and is aligned with the opening 236. The front roof rail 118 includes an upper channel-shaped member or panel 240 and a lower channel-shaped member or panel 242 joined to the upper member. The upper member 240 includes a bottom wall 244 having a mounting opening 246 aligned with the opening 236. As shown, the opening 246 has a diameter approximately equal to a diameter of the opening 236. Similarly, the lower member 242 includes a bottom wall 248 having a mounting opening 250 that is enlarged for automated bolt installation from beneath the roof panel 132. In the assembled condition of the vehicle assembly 110, the recessed portion 230 is mounted to the front roof rail 118 by positioning the bottom wall 234 on the bottom wall 244 so that the openings 236, 246 are aligned. One of the bolts 202 is inserted through the opening 250 and into the openings 246, 236 and threadingly engages the weld nut 238.

Further, the flange structure 220 of the forward peripheral edge portion 190 together with each of the forward connecting members is bonded to the front roof rail 118. Additionally, the bolts 202 connecting each of the forward connecting members to the front roof rail 118 are positioned inwardly or rearwardly of the adhesive 200, with the adhesive providing a predetermined gap of approximately 4 mm to approximately 6 mm (e.g., approximately 5 mm) between the roof panel 132 (together with the forward connecting members) and the front roof rail 118. For example, as depicted in FIG. 3, the horizontal wall 224 of the flange structure 220 together with the mounting flange 214 of the forward end portion 210 of the forward connecting member 182 is bonded to the upper member 240 of the front roof rail 118 via the adhesive 200. The bolt 202 connecting the forward connecting member 182 to the front roof rail 118 is located rearwardly of the adhesive 200.

The rearward connecting member 192 includes a rearward end portion 260 secured to the roof panel 132 and a forward end portion 262 secured to the rear roof rail 120. Particularly, as illustrated in FIG. 4, the rearward end portion 260 includes a mounting flange 264 which is curved downwardly toward the rear roof rail 120. As indicated previously, provided at the rearward end portion 142 of the roof panel 132 is the rearward peripheral edge portion 192. A flange structure 266 is provided at the rearward peripheral edge portion 192. In contrast to flange structure 220, the flange structure 266 can be defined only by a vertical wall 270. The mounting flange 264 of the rearward end portion 260 of the rearward connecting member 192 is fixedly secured (e.g. welded) to the vertical wall 270.

The rearward connecting member 192 further includes a bottom wall 272 having a mounting opening 276. A locking member, such as a weld nut 278, is secured to the bottom wall 276 and is aligned with the opening 276. The rear roof rail 120 includes an upper channel-shaped member or panel 280 and a lower channel-shaped member or panel 282 joined to the upper member. The upper member 280 includes a bottom wall 284 having a mounting opening 286 aligned with the opening 276. As shown, the opening 286 has a diameter approximately equal to a diameter of the opening 276. Similarly, the lower member 282 includes a bottom wall 288 having a mounting opening 290 that is enlarged for automated bolt installation from beneath the roof panel 132. In the assembled condition of the vehicle assembly 110, the bottom wall 272 is positioned on the bottom wall 284 so that the openings 276, 286 are aligned. One of the bolts 202 is inserted through the opening 290 and into the openings 286, 276 and threadingly engages the weld nut 278. Further, the underside of the roof panel 132 is bonded to the rear roof rail 120 via the adhesive 200. The bolt 202 connecting the rearward connecting member 192 to the rear roof rail 120 is positioned outwardly or rearwardly of the adhesive 202, with the adhesive providing a predetermined gap of approximately 4 mm to approximately 6 mm (e.g., approximately 5 mm) between the roof panel 132 and the rear roof rail 120. With the location of the bolt 202 outside of the adhesive 200 (i.e., in a wet area), an isolation clip and/or torque tape (not shown) can be positioned between the rearward connecting member 192 and the rear roof rail 120 to prevent galvanic corrosion. The tape can also provide a seal and torque retention for the bolt 202.

Figure 5A:
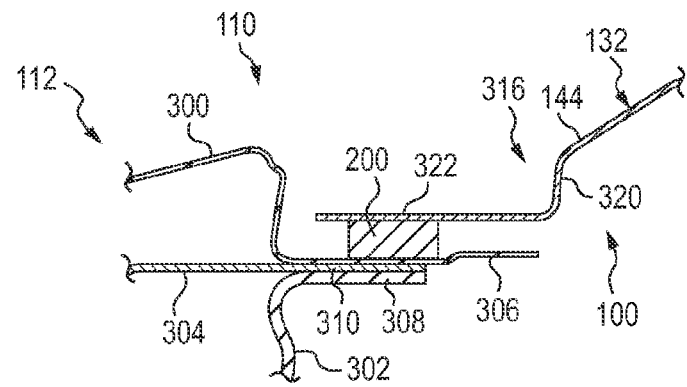
FIG. 5A is a cross-sectional view taken along a side portion of the assembled vehicle assembly.
Figure 5B:
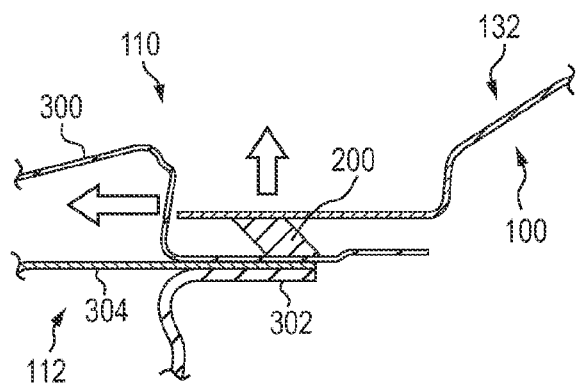
FIGS. 5B and 5C illustrate thermal distortion of the attached roof panel relative to the vehicle body when the vehicle assembly is heated in a paint bake oven during the manufacture of the vehicle assembly.
Figure 5C:
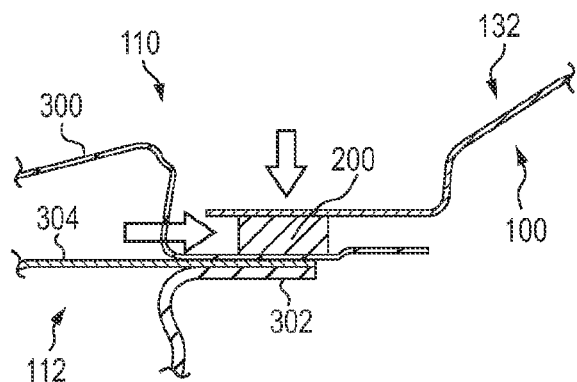

The connection of the vehicle roof structure 100 to each of the body members 112, 114 of the vehicle body 102 will now be described. The body members 112, 114 may be identically constructed, but for their disposition on opposite sides of the vehicle assembly 110. To simplify the explanation of the present disclosure, only the construction of the body member 112 and its connection to the vehicle roof structure 100 will be discussed, but it should be understood that the body member 114 can have the same construction with a similar connection to the vehicle roof structure 100. With reference now to FIG. 5A, the body member 112 includes an outer panel 300, an inner panel 302, and interposed between them a reinforcement 304. Generally, the outer panel, inner panel and reinforcement have respective flange portions 306, 308, 310 having complementary forms which nest and are welded together. The side portion 144 of the roof panel 132 includes a peripheral flange structure 316 having a vertical wall 320 and a horizontal wall 322. The adhesive 200 is provided between the horizontal wall 322 and the flange portion 306 of the outer panel 300. Similar to the connection of the roof panel to the front and rear roof rails 118, 120, the adhesive provides a predetermined gap of approximately 4 mm to approximately 6 mm (e.g., approximately 5 mm) between the roof panel 132 the body member 112. FIG. 5A shows a pre-bake condition of the vehicle assembly 110. FIG. 5B shows the vehicle assembly 110 in a baking condition. As the roof panel 132 expands upwardly and outwardly, the adhesive 202 absorbs the expansion. As shown in FIG. 5C, the roof panel 132 returns to the pre-bake condition. Thus, the continuous spacing or gap provided by the adhesive 200 allows the aluminum roof panel 132 to distort during baking and curing of the adhesive (e.g., during an e-coat process) and allows shearing of the adhesive without the adhesive failing and without deformation of either the roof panel 132 or the body member 112.

As indicated above, rigidly attaching the aluminum-based alloy vehicle roof structure 100 to the steel vehicle body 102 (i.e., vehicle components with dissimilar coefficients of thermal expansion—about $22.5 \times 10^{-6}$ m/m K for aluminum and about $13 \times 10^{-6}$ m/m K for steel) will generate thermal stresses when the temperature is raised or lowered. On heating, tensile stresses develop in the lower coefficient of thermal expansion material and compressive stresses develop in the material with the higher coefficient of thermal expansion. Thus, the roof panel 132 of the vehicle roof structure attached to the vehicle body 102 will be subjected to compressive thermal stresses with increase in temperature, the thermal stresses increasing generally in proportion to the temperature.

After assembly, but before attachment of closures such as doors or hoods, the vehicle assembly 110 is washed and then painted. The paint must be cured by exposure to elevated temperatures, requiring that the vehicle assembly 100 to pass through at least one paint bake oven, subjecting the vehicle assembly to temperatures of up to 200° C. for a period of not less than 20 minutes. This temperature establishes the greatest compressive stress developed in the vehicle roof structure. The roof panel 132, when subjected to compressive loads or stresses may deform, forming a buckle. If the buckling stress exceeds the yield stress of the metal of the roof panel, the buckle will be permanent and the roof panel 132 will not adopt its original configuration even after even after the vehicle assembly 110 exits the oven and cools.

As evident from the foregoing, to prevent distortion of the vehicle roof structure 100 as described above, the present disclosure provides a method of assembling a vehicle including the vehicle body 102 formed of steel or a steel alloy and the vehicle roof structure 110 formed of aluminum or an aluminum-based alloy. The vehicle body includes the pair of laterally spaced body members 112, 114, the front roof rail 118 and the rear roof rail 120. Each roof rail spans between the body members and is welded to the body members. The vehicle roof structure 110 includes the roof panel 132, the roof stiffeners 150-158, the forward connecting members 180-186 and the rearward connecting member 192. The roof stiffeners, forward connecting members and rearward connecting member are welded to the roof panel 132. The adhesive 200 is applied around the entire perimeter of the roof 130. The vehicle roof structure 110 is positioned on the roof, and the plurality of bolts 202 is installed from an underside of the roof panel along the adhesive application areas for connecting the roof and vehicle roof structure. The bolts connect the forward connecting members to the front roof rail 118 and the rearward connecting member to the rear roof rail 120. A spacing or pitch is provided between adjacent bolts 202 of approximately 450 mm. A continuous spacing of approximately 4 mm to approximately 6 mm (e.g., approximately 5 mm) is provided between the roof panel 132 and the vehicle body 102 by use of the adhesive 200. The bolts 202 connecting the forward connecting members to the front roof rail 118 are positioned inwardly of the adhesive 200. The at least one bolt connecting the rearward connecting member 192 to the rear roof rail 120 is positioned outwardly of the adhesive.

By installing the plurality of bolts 202 along the adhesive application areas between the vehicle roof structure 100 and vehicle body 102, the position of the roof panel 132 on the vehicle body can be held during baking of the vehicle assembly 110. The bolts 202 constrain the roof panel 132 in the vertical direction and the forward and rearward bolting parts or connecting members are secured to the roof panel 132 to facilitate bolting between the vehicle roof structure 100 and the vehicle body 102. Further, the bolts 202 are inserted from beneath the roof panel 132 which allows the bolts to fit under a styling surface associated with the vehicle roof. This also provides access for automated bolt installation. With the use of the bolts together with the adhesive 200 as described above, the roof panel 132 can still experience some bowing, but the result is much less than that of an unconstrained roof panel due to the fixing at the predetermined bolt points.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
   a vehicle body including a pair of laterally spaced body members for defining sides of a passenger compartment and a front roof rail and a rear roof rail spanning between the body members, the body members together with the front and rear roof rails support a vehicle roof structure over the passenger compartment, the vehicle body is formed of steel or a steel alloy; and
   the vehicle roof structure including a roof panel, a roof stiffener, a forward connecting member and a rearward connecting member, the vehicle roof structure is formed of aluminum or an aluminum-based alloy,
   wherein the vehicle roof structure is bonded to the vehicle body via an adhesive, and further including a plurality of bolts installed along adhesive application areas between the vehicle body and the vehicle roof structure for attaching the vehicle roof structure to the vehicle body, at least one bolt connects the forward connecting member to the front roof rail and at least one bolt connects the rearward connecting member to the rear roof rail,
   wherein each connecting member is separate from the roof panel and is fixedly secured to the roof panel to facilitate bolting between the roof panel and the vehicle body, the at least one bolt connecting the forward connecting member to the front roof rail is positioned inwardly of the adhesive, and the at least one bolt connecting the rearward connecting member to the rear roof rail is positioned outwardly of the adhesive,
   wherein the adhesive together with the plurality of bolts reduce thermal distortion of the attached roof panel relative to the vehicle body when the vehicle assembly is heated in a paint bake oven during the manufacture of the vehicle assembly.

2. The vehicle assembly of claim 1, wherein the plurality of bolts includes approximately twenty-one bolts and a spacing or pitch between adjacent bolts of the plurality of bolts is approximately 450 mm.

3. The vehicle assembly of claim 2, wherein the adhesive provides for a continuous spacing between the roof panel and the vehicle body of approximately 4 mm to approximately 6 mm.

4. The vehicle assembly of claim 1, wherein the forward connecting member includes a forward end portion secured to the roof panel and a rearward end portion secured to the roof stiffener, the forward connecting member extends substantially longitudinally on the roof panel.

5. The vehicle assembly of claim 4, wherein forward connecting member further includes a recessed portion which is mounted to the front roof rail and a raised portion located rearward of the recessed portion which engages an underside of the roof panel.

6. The vehicle assembly of claim 4, wherein the roof panel includes a flange structure provided at a peripheral edge portion, the flange structure defined by a vertical wall and a horizontal wall, the forward end portion of the forward connecting member is welded to the horizontal wall, the horizontal wall together with the forward end portion is bonded to the front roof rail.

7. The vehicle assembly of claim 1, wherein the rearward connecting member includes a rearward end portion secured to the roof panel and a forward end portion secured to the rear roof rail, the rearward connecting member extends laterally across the roof panel.

8. The vehicle assembly of claim 7, wherein the roof panel includes a flange structure provided at a peripheral edge portion, the flange structure defined by a vertical wall, the rearward end portion of the rearward connecting member is welded to the vertical wall.

9. The vehicle assembly of claim 1, wherein each bolt is inserted from beneath the roof panel.

10. The vehicle assembly of claim 9, wherein the front roof rail includes an upper panel and a lower panel, the lower panel includes a mounting opening for insertion of one of the bolts for fastening the upper panel of the front roof rail to the forward connecting member.

11. The vehicle assembly of claim 9, wherein the rear roof rail includes an upper panel and a lower panel, the lower panel includes a mounting opening for insertion of one of the bolts for fastening the lower upper panel of the rear roof rail to the rearward connecting member.

12. A method of assembling a vehicle comprising:
providing a vehicle body formed of steel or a steel alloy, the vehicle body includes a pair of laterally spaced body members, a front roof rail and a rear roof rail, each roof rail spans between the body members and is welded to the body members, the vehicle body defines a roof;
providing a vehicle roof structure formed of aluminum or an aluminum-based alloy, the vehicle roof structure includes a roof panel, a roof stiffener, a forward connecting member and a rearward connecting member, the roof stiffener, forward connecting member and rearward connecting member are welded to the roof panel;
applying an adhesive around the entire perimeter of the roof;
positioning the vehicle roof structure on the roof;
installing a plurality of bolts between the roof and vehicle roof structure, at least one bolt connects the forward connecting member to the front roof rail and at least one bolt connects the rearward connecting member to the rear roof rail; and
positioning the at least one bolt connecting the forward connecting member to the front roof rail inwardly of the adhesive, and positioning the at least one bolt connecting the rearward connecting member to the rear roof rail outwardly of the adhesive.

13. The method of claim 12, further including providing a spacing or pitch between adjacent bolts of approximately 450 mm.

14. The method of claim 12, further including providing a continuous spacing between the roof panel and the vehicle body of approximately 4 mm to approximately 6 mm by use of the adhesive.

15. The method of claim 12, further including installing the plurality of bolts from an underside of the roof panel.

16. A vehicle assembly comprising:
a vehicle body including a pair of laterally spaced body members for defining sides of a passenger compartment and a front roof rail and a rear roof rail spanning between the body members, the body members together with the front and rear roof rails support a vehicle roof structure over the passenger compartment, the vehicle body is formed of steel or a steel alloy; and
the vehicle roof structure including a roof panel, a roof stiffener, a forward connecting member and a rearward connecting member, the vehicle roof structure is formed of aluminum or an aluminum-based alloy,
wherein the vehicle roof structure is bonded to the vehicle body via an adhesive, and further including a plurality of bolts installed along adhesive application areas between the vehicle body and the vehicle roof structure for attaching the vehicle roof structure to the vehicle body, at least one bolt connects the forward connecting member to the front roof rail and at least one bolt connects the rearward connecting member to the rear roof rail,
wherein each connecting member is separate from the roof panel and is fixedly secured to the roof panel to facilitate bolting between the roof panel and the vehicle body, the forward connecting member includes a forward end portion secured to the roof panel and a rearward end portion secured to the roof stiffener, the forward connecting member extends substantially longitudinally on the roof panel,
wherein the adhesive together with the plurality of bolts reduce thermal distortion of the attached roof panel relative to the vehicle body when the vehicle assembly is heated in a paint bake oven during the manufacture of the vehicle assembly.

17. The vehicle assembly of claim 16, wherein the rearward connecting member includes a rearward end portion secured to the roof panel and a forward end portion secured to the rear roof rail, the rearward connecting member extends laterally across the roof panel.

18. The vehicle assembly of claim 16, wherein the at least one bolt connecting the forward connecting member to the front roof rail is positioned inwardly of the adhesive, and the at least one bolt connecting the rearward connecting member to the rear roof rail is positioned outwardly of the adhesive.

19. The vehicle assembly of claim 16, wherein the plurality of bolts have a spacing or pitch between adjacent bolts of approximately 450 mm and the adhesive provides for a continuous spacing between the roof panel and the vehicle body of approximately 4 mm to approximately 6 mm.

20. The vehicle assembly of claim 16, wherein each bolt is inserted from beneath the roof panel.

* * * * *